July 22, 1930.  I. PECHAN  1,771,345
AIMING TELESCOPE CONSTRUCTED AS A BREECH SIGHT
Filed April 26, 1928
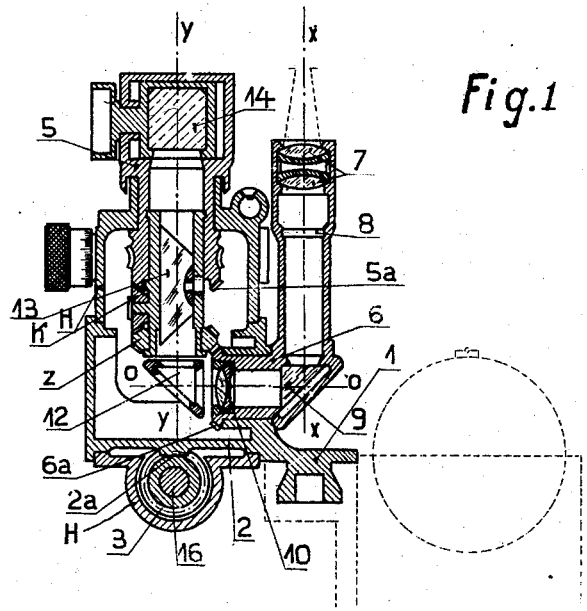
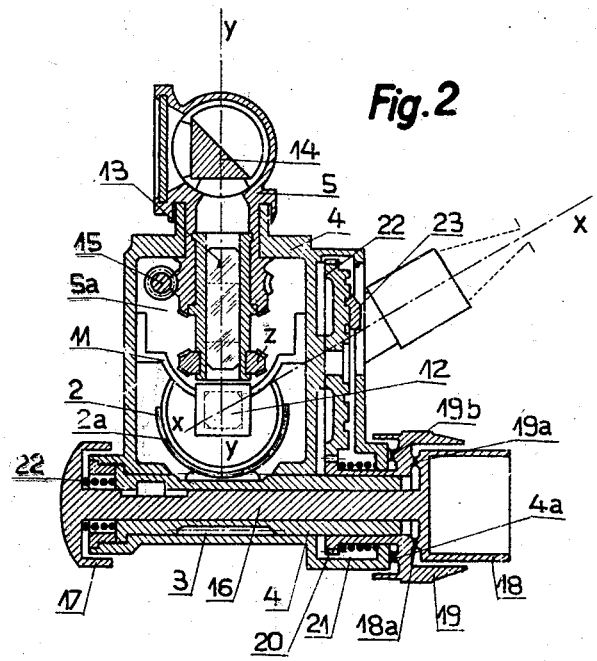
Inventor:
I. Pechan
By Langner, Parry, Card & Langner
Atty Patented July 22, 1930

1,771,345

UNITED STATES PATENT OFFICE

IGNAZ PECHAN, OF VIENNA, AUSTRIA, ASSIGNOR TO CZECHOSLOVAK COMPANY: C. P. GOERZ OPTISCHE ANSTALT AKTIENGESELLSCHAFT, AKCIOVA SPOLECNOST K. P. GOERZ OPTICKY USTAV, OF BRATISLAVA, CZECHOSLOVAKIA

AIMING TELESCOPE CONSTRUCTED AS A BREECH SIGHT

Application filed April 26, 1928, Serial No. 273,131, and in Germany May 18, 1927.

The recoil of the fire arm may easily exert an unfavorable influence on the accuracy of the aiming device if the same is not of a sufficiently robust construction. This heavy construction, however, results on recoil increased forces due to inertia, which have for their consequence not only an increase of the strains exerted on the material, but also a reduction of the accuracy of adjustment.

These drawbacks may be obviated according to the invention by mounting, for reducing the masses subject to the recoil, the aiming telescope together with the optical elements provided in front of the same and in common with all the structural elements required for the adjustment for the firing and ground angles and the side angle organically connected in one casing.

A constructional form of the subject matter of the application is shown by way of example as a machine gun aiming device, Fig. 1 being a sectional front elevation and Fig. 2 a sectional side elevation.

The bed plate 1 mounted in a dove tailed groove of the machine gun body forms part of the hollow cylindrical spindle 2 provided on its periphery with a worm toothing into which engages a worm 3 journalled in the bottom part of the casing 4.

This casing is in turn journalled on the outer periphery of the hollow cylindrical spindle 2 concentric to the objective axis O, O of the angular telescope 6, which latter is in turn mounted in the hollow spindle to rotate around this axis, so that any desired inclination may be imparted to the eye piece tube with the axis $x$, $x$ perpendicular to the objective axis. In the angular telescope 6 there is arranged besides the eye piece 7 and the aim line plate 8 the single reflecting prism 9 and finally the objective 10. In front of the objective 10 there is secured in the casing 4 by means of the yoke 11 the single reflecting prism 12 reflecting the axis O, O, into the line Y, Y perpendicular thereto.

In the casing 4 is journalled the head 5 to rotate around the said axis $y$, $y$ such head containing the entering reflector 14 rotatable in the vertical plane. The lateral adjustment of the aiming line is effected in the well known manner by turning the worm 15 engaging into a suitable worm wheel on the reflector head 5. For the purpose of rectifying the image required in each lateral adjustment of the aiming line and in each vertical turning of the eye piece axis a reversing prism 13 is provided in the well known manner the rotating of which around the vertical axis $y$, $y$ is brought about by the rolling of the bevel wheel K rotatably mounted on a horizontal journal pin of the prism frame on the one hand along the bevel wheel teeth $5^a$ on the bottom edge of the reflector head and on the other hand, by means of the loosely mounted intermediate wheel $z$, along the bevel wheel teeth $6^a$ of the objective tube. The adjustment of the aim line in accordance with the ground and firing angle may conveniently be effected by separate pinions, each provided with a division. For this purpose for instance the worm spindle 3 is made hollow and is connected by a key and groove with the axially movable spindle 16, which carries on the one hand a handle disc 17 and on the other hand a drum 18 with a division on which the ground angle may be adjusted by means of a pointer mark provided on the edge of a handle disc 19 rotatably mounted on the worm spindle. The handle disc 19 carries a spur pinion 20 and is forced into the interior of the casing by the action of a pressure spring 21. The spur pinion 20 meshes with a large spur wheel 22 into the disc of which a plane spiral groove is cut into which engages a pointer mark 23 guided radially and permitting to adjust in the well known manner the firing angle. The handle disc carries on either side locking teeth $19^a$ and $19^b$ for preventing the ground and firing angle once adjusted from being changed accidentaly since the two sets of locking teeth are held in engagement with suitable teeth $4^a$ at the edge of the casing and teeth $18^a$ on the division drum, so that by pulling outwards by the height of the locking teeth and rotating the handle disc 19, the firing angle alone, and by forcing inwards and rotating the handle disc 17 the ground angle alone may be adjusted.

The objective 10 may also be arranged between the reflector 12 and the reversing prism 13.

What I claim is:

1. An aiming telescope constituting a breech sight for a fire arm comprising an angular light entering part and an angular eye piece part of a telescope, a reflecting rectangular isosceles prism interposed between the said two parts of the telescope, one of the small sides of such prism being permanently perpendicular to the optical axis of the leg of the light entering part of the said telescope next to such reflecting prism, and the other small side of the said reflecting prism being permanently perpendicular to the optical axis of the leg of the eye piece part of the said telescope, next to the said reflecting prism, means for rotating the light entering part of the telescope around the optical axis of its leg next to the said reflecting prism, and means for rotating the eye piece part of the telescope around the optical axis of its leg next to the said reflecting prism.

2. An aiming telescope constituting a breech sight for a fire arm comprising an angular light entering part and an angular eye piece part of a telescope, a reflecting rectangular isosceles prism interposed between the said two parts of the telescope, one of the small sides of such prism being permanently perpendicular to the optical axis of the leg of the light entering part of the said telescope next to such reflecting prism and the other small side of the said reflecting prism being permanently perpendicular to the optical axis of the leg of the eye piece part of the said telescope next to the said reflecting prism, means for rotating the light entering part of the telescope around the optical axis of its leg next to the said reflecting prism, such means comprising a casing, a tube constituting the said leg and rotatably mounted in such casing, a worm wheel mounted on the said tube, and a worm mounted in the said casing and engaging into the said worm wheel, and means for rotating the eye piece part of the telescope around the optical axis of the leg next to the said reflecting prism.

3. An aiming telescope constituting a breech sight for a fire arm comprising an angular light entering part and an angular eye piece part of a telescope, a reflecting rectangular isosceles prism interposed between the said two parts of the telescope, one of the small sides of such prism being permanently perpendicular to the optical axis of the leg of the light entering part of the said telescope next to such reflecting prism and the other small side of the said reflecting prism being permanently perpendicular to the optical axis of the leg of the eye piece part of the said telescope, next to the said reflecting prism, means for rotating the light entering part of the telescope around the optical axis of its leg next to the said reflecting prism and means for rotating the eye piece part of the telescope around the optical axis of its leg next to the said reflecting prism, such means comprising a hollow spindle fixed to the fire arm, a bearing located in such hollow spindle for the leg portion of the eye piece part of the said telescope next to the said reflecting prism, a worm wheel segment on such hollow spindle, a worm engaging such worm wheel segment, and means for rotating such worm.

4. An aiming telescope constituting a breech sight for a fire arm comprising an angular light entering part and an angular eye piece part of a telescope, a reflecting rectangular isosceles prism interposed between the said two parts of the telescope one of the small sides of such prism being permanently perpendicular to the optical axis of the leg of the light entering part of the said telescope next to such reflecting prism and the other small side of the said reflecting prism being permanently perpendicular to the optical axis of the leg of the eye piece part of the said telescope next to the said reflecting prism, means for rotating the light entering part of the telescope around the optical axis of its leg next to the said reflecting prism, such means comprising a casing, a tube constituting the said leg and rotatably mounted in such casing, a worm wheel mounted on the said tube and a worm mounted in the said casing and engaging into the said worm wheel and means for rotating the eye piece part of the telescope around the optical axis of its leg next to the said reflecting prism, such means comprising a hollow spindle fixed to the fire arm, a bearing located in such hollow spindle for the leg portion of the eye part of the said telescope next to the said reflecting prism, a worm wheel segment on such hollow spindle, a worm engaging such worm wheel segment, such worm being journalled in the said casing, and two independent means for rotating such worm whereby two independent adjustments are imparted to the said worm segment.

In testimony whereof I have affixed my signature.

IGNAZ PECHAN.